United States Patent
Kim et al.

(10) Patent No.: US 8,762,248 B2
(45) Date of Patent: Jun. 24, 2014

(54) PURCHASING SYSTEM ON INTERNET AND METHOD THEREOF

(75) Inventors: Chin Tae Kim, Gunpo (KR); Sung Yeob Lee, Pyeongtaek (KR); Tae Gyu Lee, Osan (KR)

(73) Assignee: LG CNS Co., Ltd., Seoul (KR)

( * ) Notice: Subject to any disclaimer, the term of this patent is extended or adjusted under 35 U.S.C. 154(b) by 5188 days.

(21) Appl. No.: 09/837,291

(22) Filed: Apr. 19, 2001

(65) Prior Publication Data

US 2001/0034698 A1    Oct. 25, 2001

(30) Foreign Application Priority Data

Apr. 20, 2000 (KR) .................................. 2000-20977
Jun. 28, 2000 (KR) .................................. 2000-35981

(51) Int. Cl.
    *G06Q 40/00*    (2012.01)
(52) U.S. Cl.
    USPC ............................................. 705/37; 705/35
(58) Field of Classification Search
    USPC ........................... 705/26, 80, 37, 27; 370/401
    See application file for complete search history.

(56) References Cited

U.S. PATENT DOCUMENTS

| | | | |
|---|---|---|---|
| 6,647,373 B1* | 11/2003 | Carlton-Foss | 705/37 |
| 7,451,106 B1* | 11/2008 | Gindlesperger | 705/37 |
| 2003/0014318 A1* | 1/2003 | De La Motte et al. | 705/26 |

OTHER PUBLICATIONS

Jason Pritchard, "COM and CORBA Side by Side: Architectures, Strategies, and Implementations", Jul. 16, 1999, Addison-Wesley Pub Co., (Exemplary sections of the text disclosed in background art are included for the Examiner's convenience).
Clive Finkelstein and Peter Aiken, "Building Corporate Portals with XML", Sep. 1999, McGraw-Hill, (Exemplary sections of the text disclosed in background art are included for the Examiner's convenience).

* cited by examiner

*Primary Examiner* — Ojo Oyebisi
(74) *Attorney, Agent, or Firm* — Lowe Hauptman and Ham, LLP

(57) ABSTRACT

The present invention relates to a technology for purchasing an item to purchase automatically and jointly by using the internet, in particular to a purchasing system and a method thereof on the internet which is capable of economizing human and material resources and lowering the unit cost of an item by performing all processes from a notice of tender to an ordering automatically on the internet and purchasing an item required for many companies and establishments jointly.

29 Claims, 11 Drawing Sheets

FIG. 2

| LG Electronics-Purchasing System-Netscape | | | | | | | | |
|---|---|---|---|---|---|---|---|---|
| LG Electronics | | | We put people first | | | | | |

| Board | Purchase Principal | Purchase Procedure | Purchase Item | Purchase Inquiry | Company Introduction | Cooperation Company Registration | Quotation Transmission |

⇧ New Registration | Registration Information Amendment

New Registration for Cooperation Company

Account Information

| User Name | |
|---|---|
| Password | |
| Password Reconfirmation | |
| Company Name | |

Save | Registration Information Amendment

| Board | Purchase Principal | Purchase Procedure | Purchase Item | Purchase Inquiry | Company Introduction | Cooperation Company Registration | Quotation Transmission |

FIG. 3

```
LG Electronics-Purchasing System-Netscape                                    _ 🗗 ×
LG Electronics                              We put people first
                    | Board | Purchase  | Purchase  | Purchase | Purchase | Company      | Cooperation           | Quotation
                    |       | Principal | Procedure | Item     | Inquiry  | Introduction | Company Registration  | Transmission
```

Cooperation Company Information

Account Information

| User Name | patentkubk |
| Password | ******** | Password Confirmation | ******** |

Corporate Information

| Company Name | test | Name of Representative | |
| Business Registration No. | | Home Page | |
| Date of Foundation | | Capital | |
| Quality Certification Standard | | Venture(Yes or No) | |
| Business Type | MFR ☐ DIST ☐ CM ☐ REP ☐ | Status | New Registration Company |

○ MFR- Manufacturer
○ DIST- Distributor
○ CM- Contact Manufacturer
○ REP- Representitive

| Address(State,City) | | Zip Code | |
| Address(Province) | | Phone Number | |
| Address | | Fax Number | |

Main Products

| Main Product 1 | | Main Product 2 | |

Number of Employees

| Total | 0 | Quality Management | 0 |
| Research/Development | 0 | Sales | 0 |
| Production | 0 | And Others | 0 |

Other Registration Information

| Manufacturer Registration | Register a manufacturer and a factory(essential) |
| Item Registration | Register items to trade(essential) |
| Sales Status Registration | Register sales status about main business acquaintance and main item for 3 years(select) |
| Contact Registration | Register information of a contact person and business desire area(essential) |

Business transaction status of LG Group

Remark(Merits on the comparison with other makers)

[Cancel]  [Save Temporarily]  [End/Registration]

| Board | Purchase Principal | Purchase Procedure | Purchase Item | Purchase Inquiry | Company Introduction | Cooperation Company Registration | Quotation Transmission |

FIG. 4A

| | | | | | |
|---|---|---|---|---|---|
LG Electronics-Internet Purchasing System-Netscape Cooperation Company Manufacturer Registration

[Reference] [Addition] [Save] [Delete] [Close]

| Number | Select | Manufacturer | Address | Telephone Number | Fax Number |
|---|---|---|---|---|---|
| | | | | | |

FIG. 4B

LG Electronics-Internet Purchasing System-Netscape

Cooperation Company Contact Registration

[Reference] [Addition] [Save] [Delete] [Close]

| Number | Select | First Name | Last Name | Position | E-mail ID | Telephone Number | Fax Number |
|---|---|---|---|---|---|---|---|
| | | | | | | | |

FIG. 6

| Cooperation Company Item Registration-Netscape | | |
|---|---|---|
| Item Classification [Circuit ▽] | | Retrieval |

[Save] [Close]

| Number | Commodity | Select |
|---|---|---|
| 1 | ADAPTER | ☐ |
| 2 | BATTERY | ☐ |
| 3 | CAPACITOR CERAMIC | ☐ |
| 4 | CAPACITOR ELECTROLYTIC | ☐ |
| 5 | CAPACITO FILM | ☐ |
| 6 | CAPACITOR TANTAL | ☐ |
| 7 | CATHODE | ☐ |
| 8 | CERAMIC | ☐ |
| 9 | COIL | ☐ |
| 10 | CONNECTOR | ☐ |
| 11 | CORE, FERRITE | ☐ |
| 12 | CRYSTAL | ☐ |
| 13 | DECK MECHANISM | ☐ |
| 14 | DIGITRON | ☐ |
| 15 | DIODE | ☐ |
| 16 | DRUM | ☐ |
| 17 | DY(DEFLECTION YOKE) | ☐ |
| 18 | FBT | ☐ |
| 19 | FDD | ☐ |
| 20 | FET | ☐ |
| 21 | FILTER CERAMIC | ☐ |
| 22 | FILTER LINE | ☐ |

FIG. 7

| LG Electronics-Purchasing System-Netscape | | | | | | | | _ □ × |

LG Electronics — We put people first

| Board | Purchase Principal | Purchase Procedure | Purchase Item | Purchase Inquiry | Company Introduction | Cooperation Company Registration | Quotation Transmission |

⇧ New Registration | Registration Information Amendment

Coooperation Company Information Amendment

Account Information

| User Name | |
| Password | |

[Continue] [New Registration]

| Board | Purchase Principal | Purchase Procedure | Purchase Item | Purchase Inquiry | Company Introduction | Cooperation Company Registration | Quotation Transmission |

PURCHASING SYSTEM ON INTERNET AND METHOD THEREOF

BACKGROUND OF THE INVENTION

1. Field of the Invention

The present invention relates to a technology for purchasing a request item by using the internet, in particular to a purchasing system on the internet and a method thereof.

2. Background of the Related Art

In a tender purchasing method in the related art, a company or an agency gives a public notice of a tender content such as an item, a tender method, tender date, tender place, or required documents, etc. After that, the responses to the tender are screened by hand, a bidder is selected on the basis of the screening result, and an order is placed.

Recently, the purchasing technology has been applied to the internet where a notice of tender is performed and tender documents are received over the internet. In other words, the notice of tender or documents acceptance, etc. performed by hand in the tender purchasing method in the related art is performed using the internet.

The purchasing method in the related art has problems with economic efficiency and time consumption due to human and material resources requirements. In addition, while the purchasing method in the related art using the internet can economize human and material resources, numerous problems and/or disadvantages still exist. For example, a bidder selection process still can not be performed automatically, an efficient management function of a tender object company is still insufficient, ordering must be separately performed by each company or each establishment, and a lot of time is consumed between the time of a tender to an actual order.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Accordingly, the object of the present invention is to provide an automatic purchasing method on the internet which is capable of performing all processes from a notice of tender to automatic ordering and purchasing.

Another object of the present invention is to provide an automatic purchasing method on the internet for performing automatically a bidder selection process.

In addition, another object of the present invention is to provide an automatic purchasing method on the internet which registers tender object companies in advance of tender offers, and manages them with a membership system.

Another object of the present invention is to provide an automatic purchasing method on the internet which is capable of collectively ordering items required for companies and establishments.

In order to achieve at least the above-described objects in a whole or in part, an automatic purchasing method on the internet in accordance with the present invention includes inputting information for evaluating production items and capability of a company applying for a new registration to a computer on the internet, permitting the new registration by performing an automatic screening with a program whether the company satisfies a certain condition set in advance on the basis of the inputted information, reporting a notice of tender for a purchase item on a certain site on the internet or transmitting the notice of tender collectively to registered cooperation companies through the internet, inputting tender quotations from the registered cooperation companies which submit a tender quotation, performing an automatic screening and notifying a chosen company satisfying the certain condition.

To further achieve the above-mentioned objects in a whole or in part, an automatic purchasing system on the internet in accordance with the present invention includes a web server for connecting the cooperation companies to a buyer side through the internet a program for performing the operation from the notice of tender to the ordering through the web server, an IPs (Interval Participants) database for providing information related to the operation of the program, an internal database for performing the pertinent purchase related operation by through a database server in accordance with the operation of the program, and an external database for servicing various information to the cooperation companies through the database server in accordance with the operation of the program.

To further achieve the above-described objects in a whole or in part, an automatic purchasing system on the internet in accordance with the present invention includes a region terminal for inputting order information about a purchase item required for the establishment or company placed in a region, a region server for storing the order information about the purchase item through a communication network, a main server for performing a notice of tender jointly when the order information about the purchase item transmitted from the each region server is added up and the notice of tender is performed to the each cooperation company through the internet, a parts information database for servicing the information related to the purchasable items stored in advance through the main server.

To further achieve the above-described objects in a whole or in part, an automatic purchasing method on the internet in accordance with the present invention includes inputting the order information of the item requested by the each establishment or company through the terminal of the pertinent region, transmitting the order information to the main server after storing the order information inputted through the terminal of the each region to the each region server, and performing the notice of tender jointly when the item is purchasable jointly or privately when the item is not purchasable jointly after adding the order information transmitted from the each region server.

To further achieve the above-described objects in a whole or in part, an automatic purchasing system on the internet includes a program for controlling the system's operations from a notice of tender to placing an order through a web server, an internal database for providing information related to a purchase in accordance with the operation of the program, and an external database for servicing information to cooperation companies in accordance with the operation of the program. automatic purchasing method on the internet includes determining whether companies applying for a new registration satisfy a certain condition set in advance by screening the companies automatically, registering the companies as cooperation companies when the companies satisfy the certain condition set in advance, and selecting a selected cooperation company by screening the registered cooperation companies.

To further achieve the above-described objects in a whole or in part, a joint purchasing system on the internet includes a plurality of region terminals for inputting order information about a purchase item required for a plurality of companies in a prescribed region, a plurality of region servers for combining and storing the order information from the plurality of region terminals about the purchase item and transmitting the combined order information through a communication network, and a main server for performing a notice of tender for a joint purchasable item when the combined order information about the purchase item is transmitted from the region servers through the communication network.

To further achieve the above-described objects in a whole or in part, a joint purchasing method on the internet includes inputting a plurality of orders for an item to purchase, transmitting the inputted orders to a main server, and performing a notice of tender for the item, wherein the plurality of orders are jointly tendered in the notice of tender to a plurality of cooperation companies through the internet.

To further achieve the above-described objects in a whole or in part, a method of matching vendors to buyers through a network includes identifying whether vendors satisfy minimum attributes, registering the vendors that satisfy minimum attributes, identifying a buyer's vendor selection criteria, notifying vendors of the vendor selection criteria, accepting bids from vendors, and selecting a selected vendor from the vendors that satisfy minimum attributes according to one or more of the vendor selection criteria.

To further achieve the above-described objects in a whole or in part, a network based sales generation system includes a spatial location engine to determine criteria of a buyer and attributes of a plurality of vendors, a registering unit to register vendors which satisfy set minimum attributes, a database containing information regarding the registered vendors, an analyzing unit to collect selection criteria from the buyer, and an engine to select a qualified vendor for the buyer based on the database information and selection criteria.

To further achieve the above-described objects in a whole or in part, a network based selection system includes a first logic unit to determine whether individual vendors meet a first set of minimum attributes, and a second logic unit to determine a set of at least one vendor based on a second set of input criteria being applied to the individual vendors which meet the first set of minimum attributes.

To further achieve the above-described objects in a whole or in part, a method for selecting a first party for a second party for engaging in a transaction includes means for entering a request identifying at least one criterion for a transaction by the second party through a network, means for qualifying the first party to a set of minimum attributes, means for identifying a qualified first party to engage in the transaction based on at least one criterion, means for providing an identification of the first and second parties to engage in the transaction.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 2 illustrates a menu on a site for applying for a new registration for a cooperation company;

FIG. 3 illustrates a menu on a site for inputting information for a cooperation company;

FIGS. 4A-4C illustrate menus on the site for selectively inputting the information of the cooperation company by categories;

FIGS. 5 and 6 illustrate menus on the site for inputting classified important items of the cooperation company;

FIG. 7 illustrates a menu on the site for amending the inputted information of the cooperation company;

DETAILED DESCRIPTION OF PREFERRED EMBODIMENTS

Figure 1A:
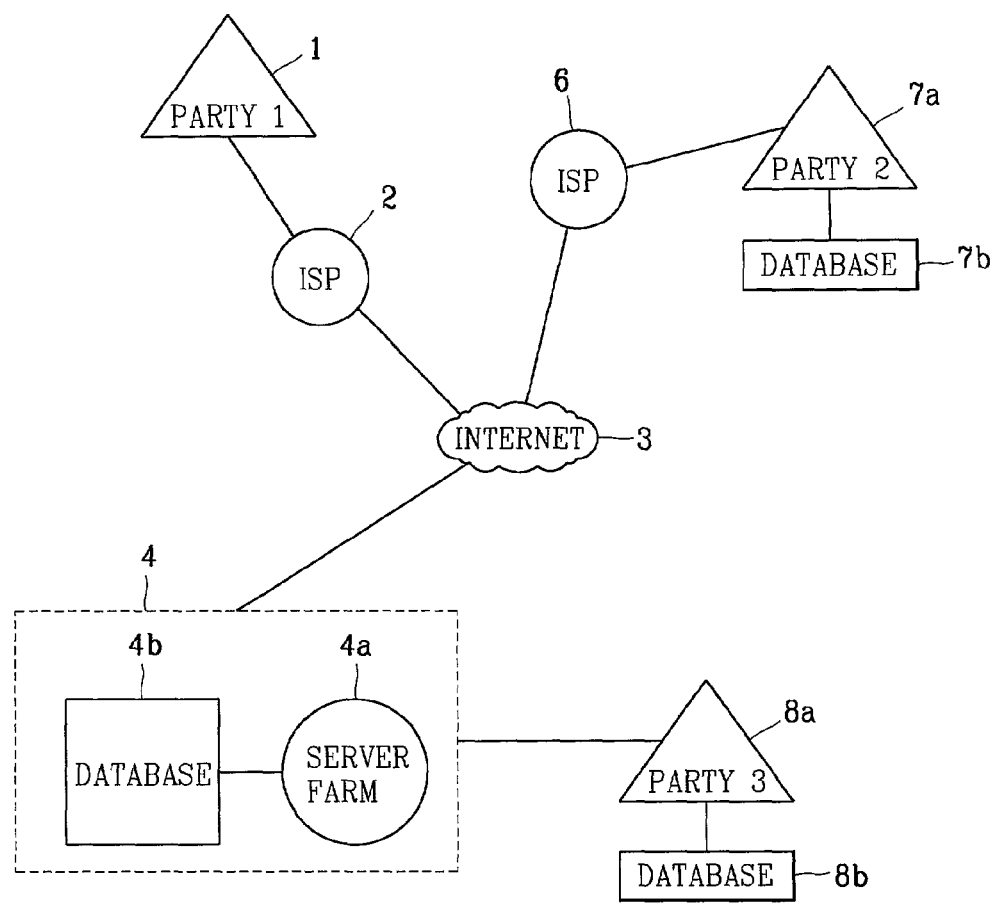
FIG. 1A is a diagram illustrating a network based system.

FIG. 1A shows a network-based system, preferably a web-based system or other equivalent or similar system, for linking buyers and vendors of goods and services according to prescribed criteria. Referring to FIG. 1A, a first party 1, such as a buyer, establishes the communication to the Internet 3 through an Internet service provider (ISP) 2. From the Internet 3, the first party 1 can establish communication with the network-based system 4. The network-based system 4 preferably includes a server farm 4a, which is made up of a plurality of servers containing instructions for sorting through information provided by the first party 1, as well as information provided by second parties, such as vendors. The information provided by second parties could be stored in a database 4b. Alternatively, a second party, such as party 2, could provide their own database of information 7b and allow the network-based application 4 to access that database through the Internet 3 or could enter their own information into the network-based application 4. Similarly, a different second party, such as party 3, could link directly to the server farm 4a to allow the network-based application 4 to access to party 3's database 8b or to enter party 3's information into the network-based application 4. In this scenario, it should be noted that any of the parties party 1, party 2 and party 3 could be either a buyer or a seller. Additionally, it should be noted that the Internet 3 could be replaced by any computer network.

Functionality built inside the system preferably includes a decision support tool that provides information typically used to make a purchase decision, and a product selection and price quotation system that preferably captures, analyzes and makes decisions based on a set of domain-specific variables. The network-based application could be connected to Internet sites, allowing the sites to link directly to the centralized server farm that serves as a host for the system's functionality and database. The product selection and quotation system 4a can also be distributed throughout a network of computers, thereby allowing vendors to use it in their own Internet and intranet applications. Open access to the production selection and quotation system is available to these systems through a series of application programmer interface (API) points. See, for example *Building Corporate Portals With XML* (*Enterprise Computing*), Finkelstein, Aiken, ISBN: 0079-137059 and *COM and CORBA Side By Side Architectures, Strategies, and Implementations*, Pritchard, ISBN: 0201379457 which are incorporated in its entirety herein by reference.

In a notice of tender on the internet situation, a tender qualification can be provided to all parties connected without any restriction. Parties with any level of order delivery capability can join the tender, so a bidder as well as a buyer can waste time and labor if the parties do not have sufficient order delivery capability. Accordingly, in order to prevent the above-described wastes of time and labor and perform an efficient tender, there is a need to pre-qualify only companies satisfying a certain condition, namely, having the supply capability required to fill a particular tender offer.

In accordance with preferred embodiments, a "cooperation company registration" item is installed on a purchasing site (e.g., home page) of the internet in order to make new companies apply for a new registration. In particular, on the purchasing site of the internet, there is a need to perform all processes from the notice of tender to the ordering automatically on the internet to purchasing items from qualified establishments or companies.

Figure 1B:
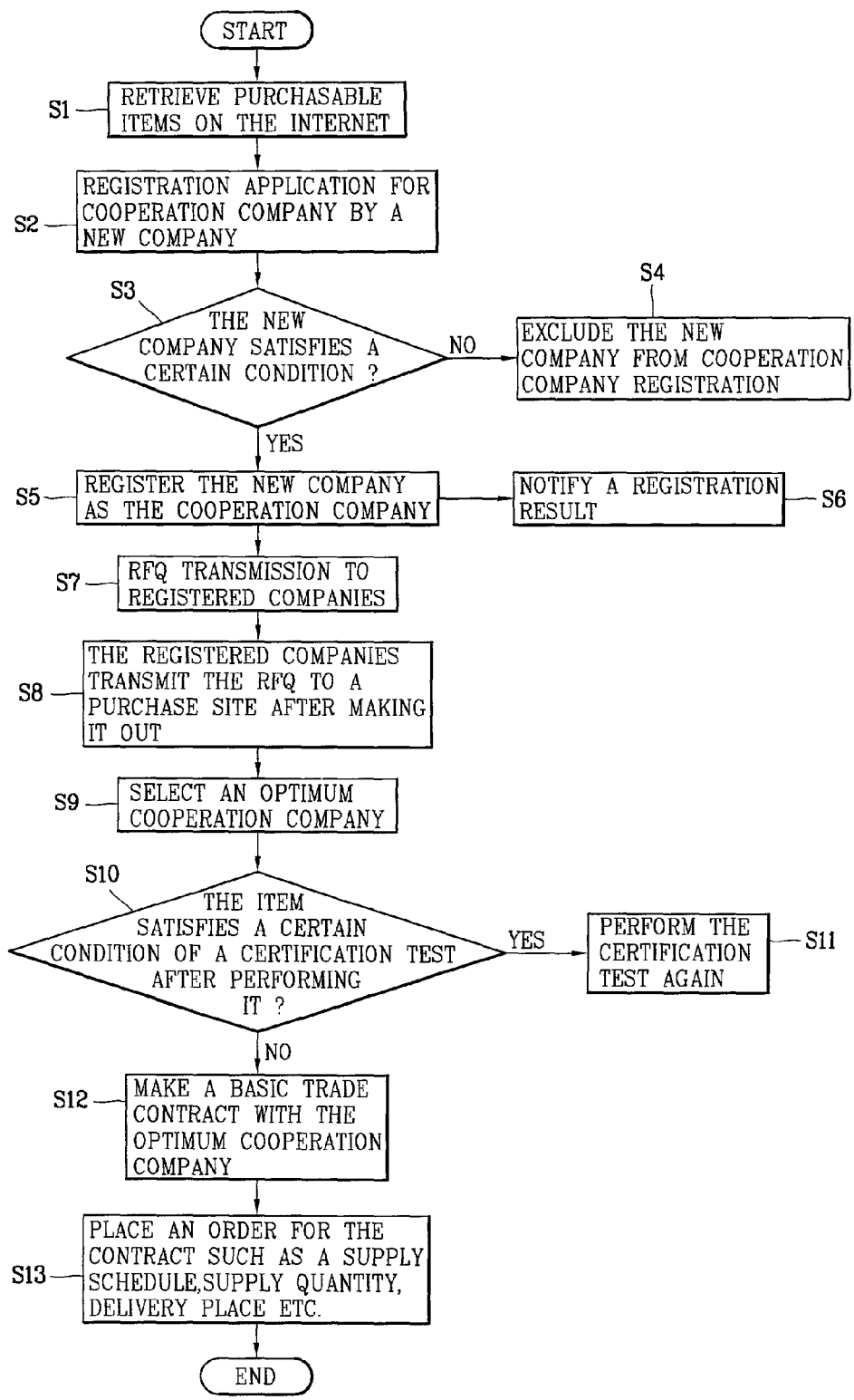
FIG. 1B is a flow chart illustrating an automatic purchasing method on the internet circumstances in accordance with a preferred embodiment of the present invention.

It will now be described in detail with reference to accompanying FIG. 1B is a flowchart illustrating a preferred embodiment of a purchasing method in internet circumstances according to the present invention. As depicted in FIG. 1B, parties are given access through the Internet in order to retrieve purchasable items by referencing an Internet purchasing site in step S1. After that, when companies apply for a new registration of a "cooperation company" that is capable of joining tender by inputting information required for the new registration in step S2. The information required for the new registration and menu for amending the information will now be described with reference to FIGS. 2-7.

Figure 4C:
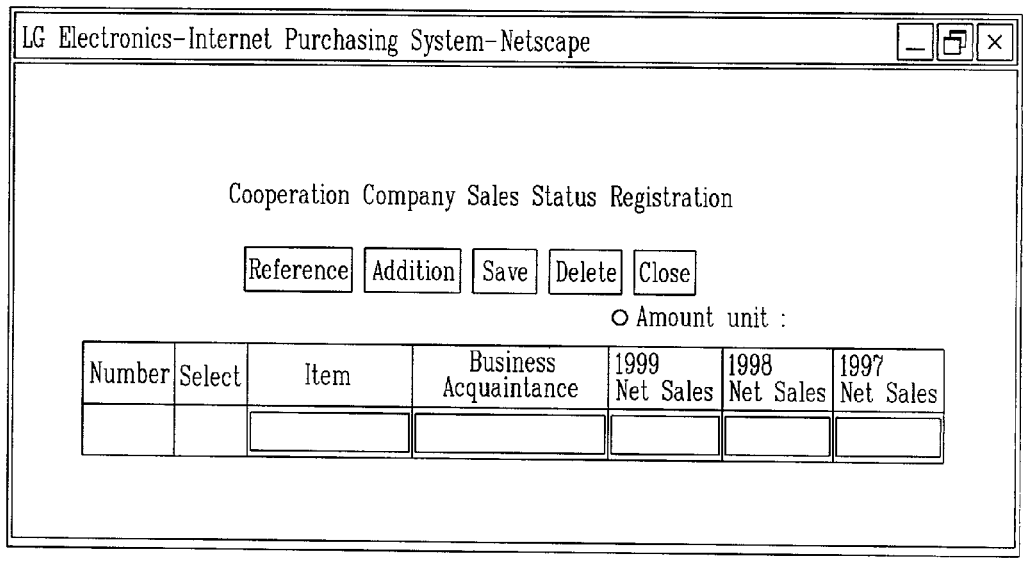

As depicted in FIGS. 2 and 3, "user name", "password", "name of company" etc. can be inputted for the system and categorized into categories such as a "new registration of cooperation company" category, which in this case happens to be a sub category of "cooperation company registration" category, and other information such as "business registration number", "date of foundation", "quality certification standard", "business type", "name of representative", "capital", address of the head office, main product, employment condition etc. can be inputted and categorized in other categories within the system such as a "cooperation company information" item which in this case happens to be another sub category of the "cooperation company registration" category. As depicted in FIGS. 4A-4C, other information such as registration of cooperation company manufacturers, cooperation company contacts, and sales statuses, etc. can be inputted and categorized in other subcategories of the "cooperation company registration" category within the system.

Figure 5:
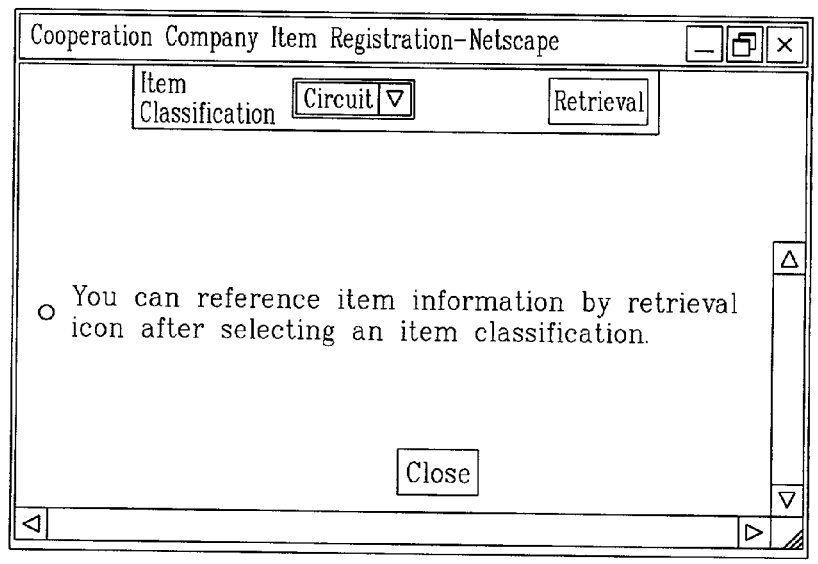

As depicted in FIGS. 5, 6 and 7, item classifications, such as the ones mentioned above, can be inputted in more detail and all the inputted information can be amended by a user through an input site, such as the web site, by selecting a cooperation company amendment item through the site depicted in FIG. 7.

Meanwhile, the buyer can screen new companies which have applied for new registrations through the site. The buyer can review the information entered by new registrants required for the new registrations. After that, the buyer can evaluate the (new) companies with a registration screening program on the basis of the document screening and actual inspection results depending on whether each (new) company satisfies a certain condition set in advance by the (new) company registration screening program in step S3. A buyer could, alternatively, not review the registrations and proceed to tender directly to registered companies.

When each new company satisfies a certain condition in step S3, which is preferably set in advance, in step S5 the company is then registered as a cooperation company and is capable of joining the tender. The result of the registration process is preferably sent to the company which applied for registration as to their approval or disapproval in step S6. If a new company which is evaluated with the new registration screening program does not satisfy the condition set in advance in step S3, the new company is excluded from the cooperation company registration in step S4. After the registration process is completed, newly registered cooperation companies can then be included in the requests for quotations (RFQ) that are transmitted to the registered cooperation companies in step S7.

Meanwhile, when a buyer gives notice of tender, the buyer can input a purchase condition of a request item, part or service on the purchasing site in accordance with the present invention by using the computer connected to the internet. For example, information such as the title (example: screw for washing machine), division (example: washing machine division), item (example: screw), the buyer in charge, registration date, due date etc. can be inputted on the purchasing site. Accordingly, the registered companies interested in the tender can reference this information and can consider proposing a bid on the tender. Other non-registered parties may also be included if deemed. However, as further incentive for registration, cooperation companies can also be given the advantage of the notice of tender being automatically transmitted to their e-mail address.

Also, when a cooperation company needs more detailed information about a tender, the option of being able to select a "purchase inquiry" item on the purchasing site can be offered, and information regarding the tender can be displayed through the site. In addition, an e-mail address of the person in charge of a requested region can be displayed when provided, and if requested, a detailed inquiry information can be transmitted through the site to the e-mail address.

Each cooperation company, in addition to being able to check the content of the notice of tender through the above-described process, can also join the tender (e.g., fill out the RFQ) and propose bids through the site transmitting bids electronically, for example, by using a computer connected to the internet in step S8.

Accordingly, the purchase site in accordance with the present invention can screen requests for quotations transmitted from the cooperation companies with a quotation screening program, and preferably can select a cooperation company satisfying a successful tender condition set in advance as the optimum cooperation company in step S9. Also, selecting the optimum cooperation company can be determined using many elements for determining the screening point with the quotation screening program, the optimum cooperation company can be selected by finding desirable screening results by vesting more weight preferentially to elements, which can be set in order of importance by a buyer, such as a tender price, past contract execution faithfulness, financial condition, technology ability, evaluation point of the cooperation company, etc.

The buyer can preferably perform a certification test of the item of tender of the optimum cooperation company selected through the screening process and can judge whether the company and the item of tender satisfies certain conditions in step S10. When the item of tender of the selected cooperation company satisfy the certain conditions and the buyer assents to the purchase, an item purchase confirmation information notification is sent to the selected cooperation company, and the buyer preferably makes a trade contract with the selected cooperation company in step S12. When the trade contract is made S12, the selected cooperation company can then set the parameters for the contract such as a supply schedule, supply quantity, delivery place, etc. S13. Alternately, when the item of the selected cooperation company does not satisfy the certain condition, the certification test is re-performed in step S11. Each re-performed certification test can vary at least one certain condition(s).

A system operating the preferred embodiment of the automatic purchasing method according to the present invention preferably uses two databases. One database can be an external database for providing various information to the cooperation companies, and the other database can be an internal database for selecting or managing the cooperation companies, where confidential information can be stored.

Figure 8:
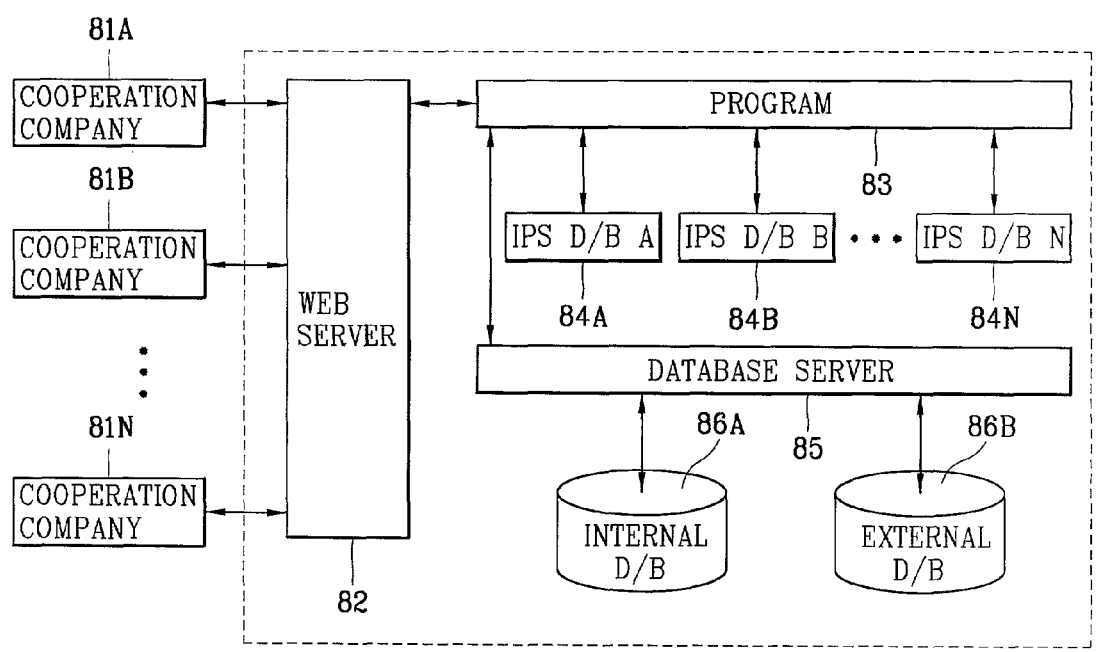
FIG. 8 illustrates a preferred embodiment of an automatic purchasing system according to the present invention.

FIG. 8 illustrates a preferred embodiment of a construction of a automatic purchasing system according to the present invention. As shown in FIG. 8, on the internet, the preferred embodiment of the automatic purchasing system has a web server 82 for connecting cooperation companies 81A, 81B, . . . , 81N to buyers through the internet and a program 83 (e.g., application program) for performing operations from the notice of tender to the ordering through the web server 82, IPS (Interval Participants). Databases 84A~84N are for providing information related to the purchase in accordance with the operation of the program 83, an internal database 86A is for performing the pertinent purchase related business through the database server 85 in accordance with the operation of the program 83, and an external database 86B is for servicing various information to the cooperation companies through the database server 85 in accordance with the operation of the program 83.

Operations of the program 83 preferably begin with the web server 82 contacting a buyer's computer in order to supply a variety of information to the cooperation companies' computers 81A, 81B, 81N. After that, the program 83 can allow for the performance of the functions from the notice of tender to the ordering through the web server 82 of the buyer. For example, the program 83 performs the evaluation for the registration of potential companies, receives and transmits quotations for the tender, checks the quotations of the companies, and interfaces the quotation price to a production system. In addition, the program 83 can transmit e-mails or other types of direct correspondence automatically to the cooperation companies in the tender and ordering, and can also check whether the transmission has been received.

Meanwhile, an internal database 86A can perform the various purchase related business through the database server 85 by performing functions such as storing, calling, amending, and deleting information related to the notice of tender to the ordering. An external database 86B can provide various information to the cooperation companies through the database server 85. For example, the external database can store information related to the technological ability of the cooperation companies, the actual results of the bidder, the financial condition of the companies, etc., and can provide the information to the cooperation companies and the buyers.

The IPS (Interval Participants) databases 84A~84N provide information related purchases in accordance with the operation of the program 83. For example, the IPS databases 84A~84N can transmit information such as purchase principal, purchase procedure, purchase item, purchase inquiry, company introduction, cooperation company registration, etc. to the cooperation company, and can respectively receive the corresponding result.

Figure 9:
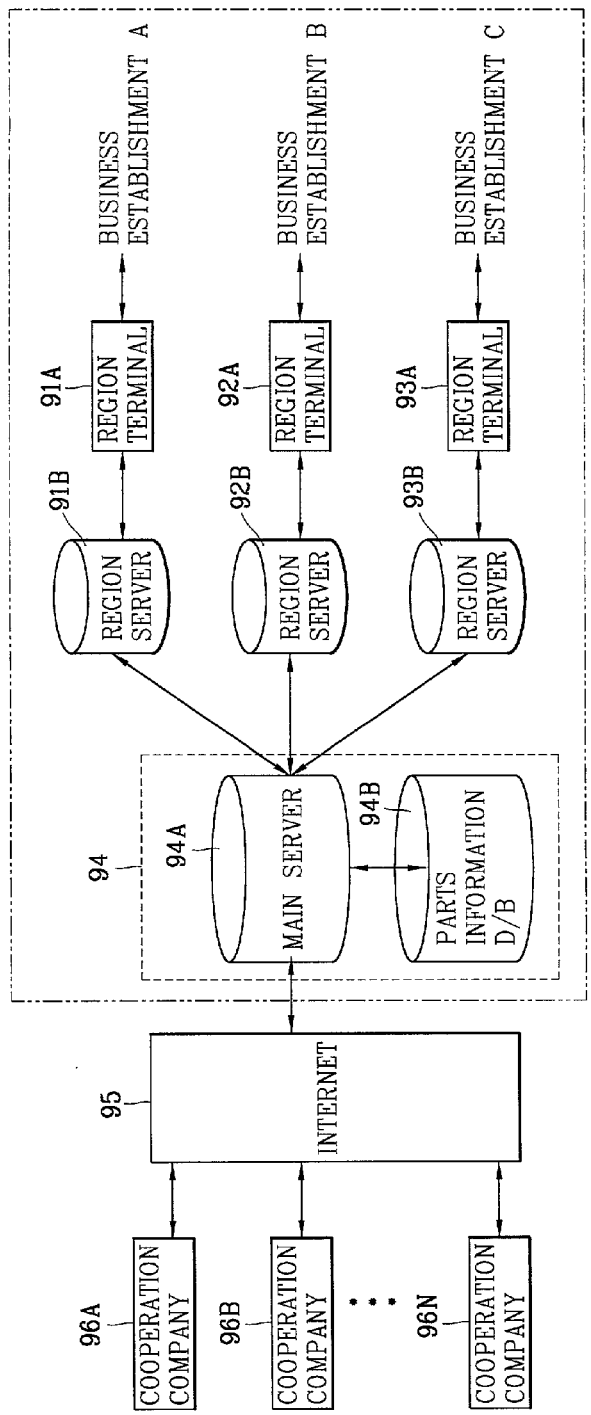
FIG. 9 is a block diagram illustrating blocks of a system adapting a joint purchasing method in accordance with the present invention.

To reduce an unit cost per item through the above-mentioned processes, there can be a need to purchase the item jointly by the plurality of companies or establishments regardless of their individual locations. As depicted in FIG. 9, a preferred system for joint purchasing in accordance with the present invention can have region terminals 91A, 92A, 93A for inputting order information about the purchase item required for the companies or establishments located in each region and region servers 91B, 92B, 93B for storing the order information about the purchase item (inputted through the region terminals 91A, 92A, 93A) and transmitting the inputted order information through a communication network. The system may also include a main server 94A for notifying jointly the tender of the purchasable joint item or notifying privately the tender of the item which is not to be purchasable jointly when it performs the notice of tender to the cooperation companies 96A, 96B, 96C through the internet 95 by adding order information about the purchase item transmitted from the region servers 91B, 92B, 93B. The system may also have a parts information database 94B for servicing information related to the tender purchasable item stored in advance through the main server 94A.

Figure 10:
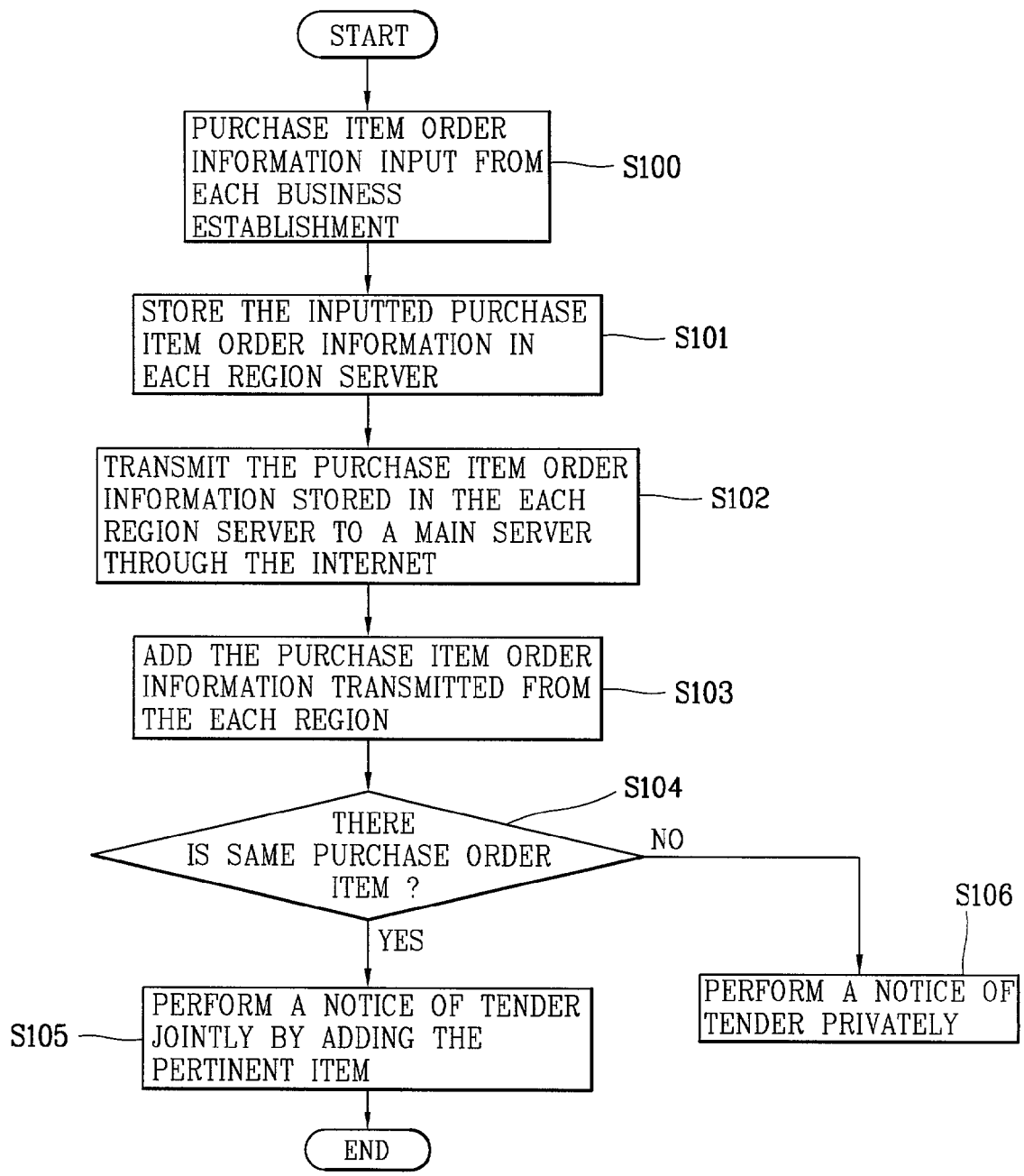
FIG. 10 is a flow chart illustrating a joint purchasing method in accordance with another preferred embodiment of the present invention.

FIG. 10 is a flow chart illustrating a joint purchasing method in accordance with another preferred embodiment of the present invention. As depicted in FIG. 10, buyers in charge of the establishments in each region can input order information using the region terminals 91A, 92A, 93A in step S100, which may be in the form of a computer. A buyer in charge can then input the order information about the item to purchase after receiving information related to the items for tender stored in advance on the parts information database 94B. For example, when the buyer of A establishment orders thirty thousand screws (e.g., screw 3×12) by using the region terminal 91A, the buyer of B establishment orders twenty thousand of the screws (Screw 3×12) by using the region terminal 92A, the buyer of C establishment orders ten thousand of the screws (Screw 3×12) by using the region terminal 93A, each of the orders can be stored in the each region server 91B, 92B, 93B in step S101. Then, the purchase order information, and can be transmitted to the main server 94A at a prescribed or certain time in step S102. After the main server 94A receives the tender, it can then add the order information about the purchase item transmitted from the each region server 91B, 92B, 93B in step S103.

Next, the system can determine whether the same item has previously or concurrently been ordered in step S104, and if so, the additional orders of screws can be ordered in bulk with a notice of tender for a total of fifty thousand of the screws capable of being performed jointly in step S105. Alternately, when the ordered item has not previously or concurrently been ordered, the notice of tender for the item can be performed privately in step S106.

Performing processes excluding the joint purchase are preferably performed in the same manner as the preferred embodiment of the present invention as shown in FIG. 1B. In other words, after registering a company, a notice of tender can be performed for the registered cooperation companies.

When the joint purchase condition is satisfied as described above, the notice of tender can be performed jointly, the item quotation request transmitted from the each cooperation company can be screened, and a cooperation company can be selected.

As described above preferred embodiments of an automatic purchasing method and apparatus in accordance with the present invention have various advantages. In a preferred embodiment of an automatic purchasing method on the internet or the like in accordance with the present invention, all processes from the notice of tender to the ordering can be performed on the internet automatically, and accordingly it is possible to economize human resources and material resources. In addition, in the automatic purchasing method on the internet in accordance with preferred embodiments of the present invention, all processes from the notice of tender to the ordering can be performed on the internet directly, conveniently and faster with quicker processing.

Also, in the automatic purchasing method and apparatus on the internet in accordance with preferred embodiments of the present invention, when the tender object companies are registered in advance and are managed with a membership and/or membership benefits, information needed mutually can be managed efficiently, and accordingly the performance of the system can be improved. In addition, in the automatic purchasing method on the internet circumstances in accordance with the present invention, the unit cost of the item can be reduced by jointly purchasing the item requested from companies or establishments.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An Internet-based automatic purchasing method performed on at least one server connected to the Internet, comprising:
   inputting a notice of tender by a buyer on a server at a purchasing site, the notice including purchasable items;
   applying for a new registration by at least one company desiring to join the tender;
   screening the at least one company to determine whether the at least one company applying for a new registration satisfy a certain condition set in advance;
   registering the at least one company as cooperation companies when the companies satisfy the certain condition set in advance;
   sending a request for quote to the cooperation companies;
   sending bids to the purchasing site by the cooperation companies in response to the request for quote; and
   selecting a selected cooperation company to supply the purchasable items by automatically screening the registered cooperation companies,
   wherein the screening, the registering, the sending the request, and the selecting are all performed automatically by the at least one server.

2. The automatic purchasing method according to claim 1, wherein the at least one company applying for the new registration inputs information on the purchasing site, the inputted information comprising information related to a "business registration number", an "establishment date", a "certification quality standard", a "business type", a "representative name", a "capital", a main product, or a present employee state.

3. The automatic purchasing method according to claim 1, wherein the screening comprises:
   determining whether the bids satisfy certain conditions.

4. The automatic purchasing method according to claim 1, further comprising an ordering process comprising:
   determining whether the selected cooperation company satisfies a certain condition by performing a certification test about a desired item; and
   ordering the desired item from the selected cooperation company which passed the certification test.

5. The automatic purchasing method according to claim 1, wherein the selected cooperation company is primarily selected by quotation price offered by the cooperation companies included in the bid.

6. The automatic purchasing method according to claim 1, wherein at least one of said servers is operatively connected to an external database for providing information to the cooperation companies, and an internal database for managing the information about the cooperation companies.

7. An Internet-based automatic purchasing system, comprising:
   a web server, the web server including a program for controlling the system's operations, the operations including notice of tender operations and ordering operations;
   an internal database, the internal database providing information related to purchases; and
   an external database, the external database providing information to cooperation companies.

8. The automatic purchasing system according to claim 7, wherein the internal database stores confidential information.

9. The automatic purchasing system according to claim 7, wherein the internal database performs operations related to purchases by passing through a database server.

10. The automatic purchasing system according to claim 7, wherein the external database provides information to the cooperation companies by passing through a database server.

11. The automatic purchasing system according to claim 7, wherein the information related to the purchases comprise at least one of a purchase principal, a purchase procedure, a purchase item, a purchase inquiry, a company introduction, a cooperation company registration and a quotation transmission.

12. An Internet-based joint purchasing system, comprising:
   a plurality of region terminals for inputting order information about a purchase item required by a plurality of companies in a prescribed region;
   a plurality of region servers for combining and storing the order information from the plurality of region terminals about the purchase item and transmitting the combined order information through a communication network; and
   a main server, the main server receiving the combined order information about the purchase item transmitted from the region servers and performing a notice of tender for a joint purchasable item through the Internet to cooperation companies.

13. The joint purchasing system according to claim 12, wherein the joint purchasing system further comprises a parts information database for providing the information related to the purchasable items stored in advance to the cooperation companies through the main server.

14. The joint purchasing system according to claim 12, wherein the main server performs the notice of tender privately when the item is not purchasable jointly.

15. An Internet-based joint purchasing method, comprising:
   inputting a plurality of orders for an item to purchase;
   transmitting the inputted orders to a main server; and
   performing a notice of tender for the item, wherein the plurality of orders are jointly tendered in the notice of tender to a plurality of cooperation companies through the Internet.

16. The joint purchasing method according to claim 15, wherein the performing of the notice of tender further comprises performing a notice of tender privately when the item is not purchasable jointly.

17. The joint purchasing method according to claim 15, wherein the orders are separately inputted from each company.

18. The joint purchasing method according to claim 15, wherein prior to the transmitting of the inputted orders to the main server, the inputted orders are stored on a corresponding region server.

19. A method of matching vendors to buyers through a network, comprising:
identifying whether vendors satisfy minimum attributes set by a buyer;
registering the vendors that satisfy the minimum attributes;
identifying the buyer's vendor selection criteria;
notifying the vendors of the vendor selection criteria;
accepting bids from the vendors; and
selecting, by the buyer, a selected vendor from the vendors that satisfy the minimum attributes according to one or more of the vendor selection criteria.

20. The method of matching vendors to buyers through a network according to claim 19, wherein the selection criteria comprises geographic region, business type or price.

21. The method of matching vendors to buyers through a network according to claim 19, further comprising notifying the selected vendor of having been selected.

22. The method of matching vendors to buyers through a network according to claim 21, wherein the notification is through one of e-mail, file transfer protocol, integration technology, DCOM, XML, CORBA, HTTP, wireless devices or instant messaging.

23. The method of matching vendors to buyers through a network according to claim 19, wherein the buyer provides the vendor selection criteria and a database stores registered vendors that satisfy minimum attributes.

24. The method of matching vendors to buyers through a network according to claim 23, wherein the buyer is prompted to input selection criteria through one or more capture forms.

25. A network based sales generation system, comprising:
a spatial location engine to determine criteria of a buyer and attributes of a plurality of vendors;
a registering unit to register vendors which satisfy set minimum attributes;
a database containing information regarding the registered vendors;
an analyzing unit to collect selection criteria from the buyer; and
an engine to automatically select a qualified vendor for the buyer based on the database information and the selection criteria.

26. The network based sales generation system as claimed in claim 25, wherein the registering unit comprises a dynamically generated application form to be completed by a vendor and compared to the set minimum attributes and stored in the database if the vendor meets or exceeds the minimum attributes.

27. The network based sales generation system as claimed in claim 25, further comprising:
a vendor notification unit to notify registered vendors of selection criteria entered by the buyer; and
a bid accepting unit to receive bids from the registered vendors, wherein the bids are stored in the database, wherein one of the bids and the selection criteria are capable of being jointly tendered by a plurality of cooperating parties.

28. The network based sales generation system as claimed in claim 25, wherein the analyzing unit comprises a dynamically generated application form to be completed by the buyer and submitted to the engine, wherein the spatial location engine and the database use the data from the completed dynamically generated application form to select at least one qualified vendor.

29. A method for selecting a first party for a second party for engaging in a transaction, comprising:
means for entering a request identifying at least one criterion for a transaction by the second party through a network;
means for qualifying the first party to a set of minimum attributes;
means for identifying a qualified first party to engage in the transaction based on the at least one criterion;
means for providing an identification of the first and second parties to engage in the transaction.

* * * * *